United States Patent Office 2,961,301
Patented Nov. 22, 1960

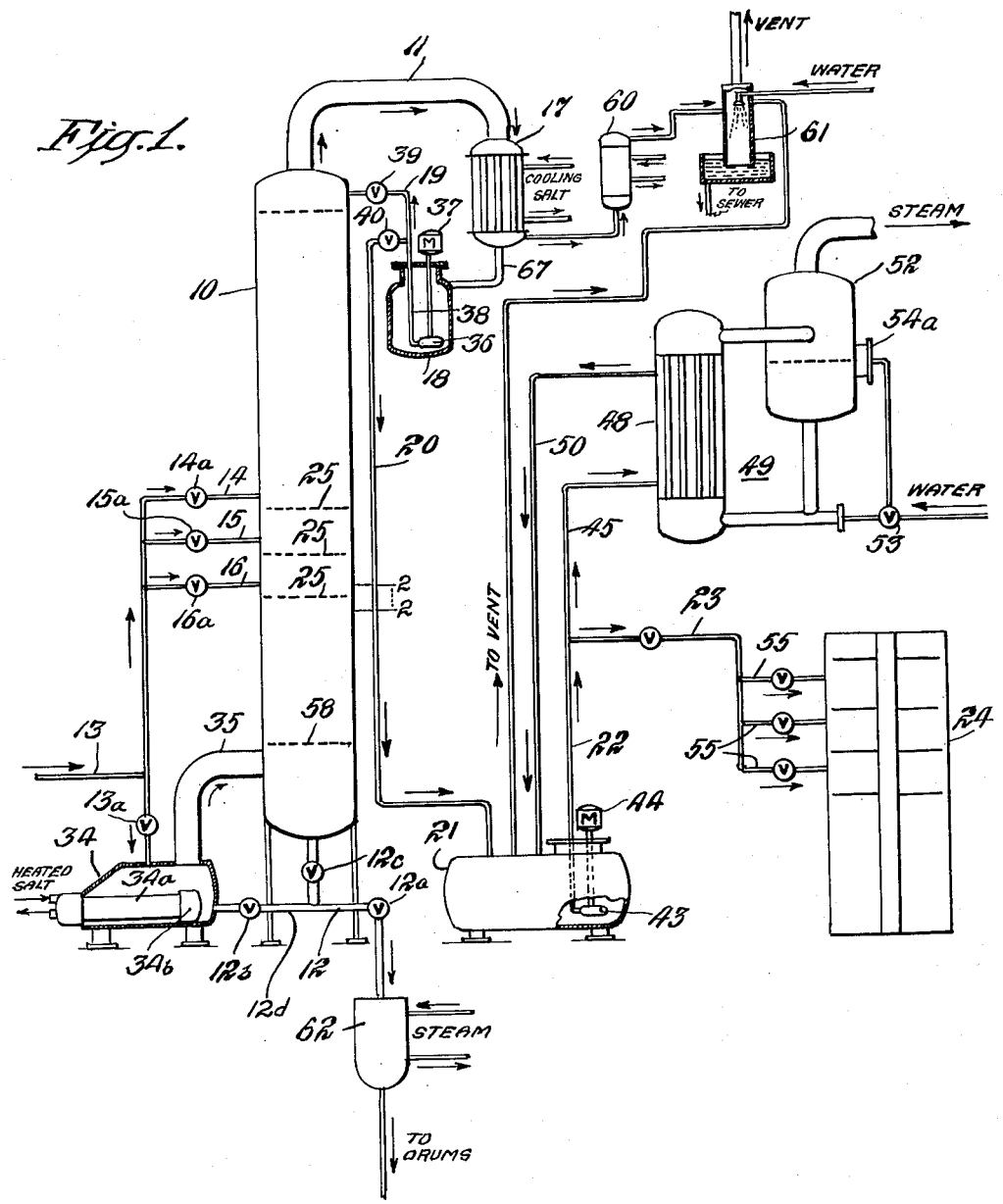

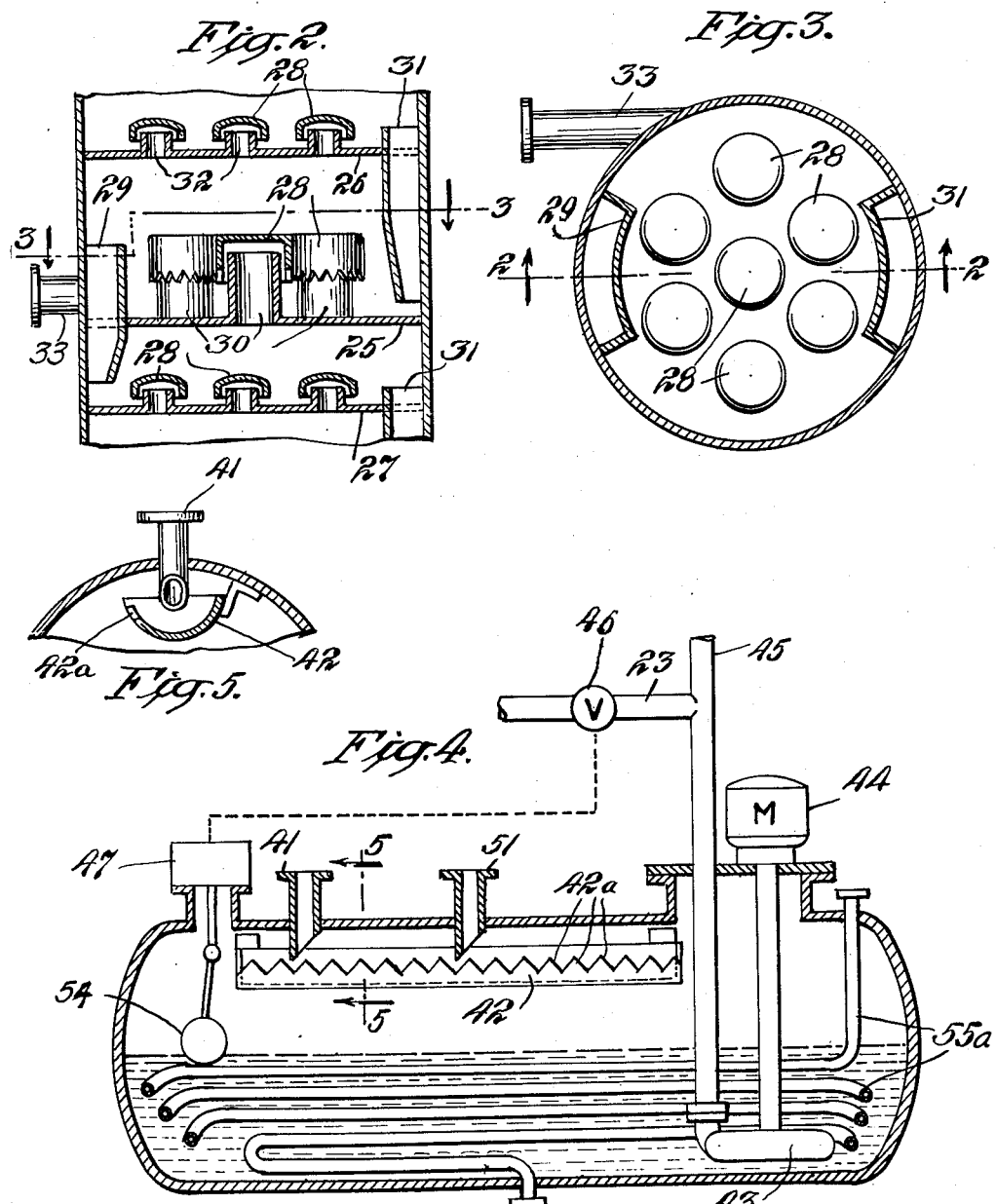

2,961,301
METHOD AND APPARATUS FOR PROCESSING SULFUR

Paul F. Steinhoff, O'Hara Township, Allegheny County, Pa., assignor to Blaw-Knox Company, Pittsburgh, Pa., a corporation of Delaware Filed Feb. 18, 1958, Ser. No. 715,964

17 Claims. (Cl. 23—227)

This invention relates to a method of and apparatus for processing sulfur in which the sulfur in the liquid state is processed through temperatures intermediate its solidus melting point and its liquid boiling point at atmospheric pressure or other pressure obtained in the process. Sulfur in the vapor state may enter into certain steps and the final refined product may be solid sulfur, but the improvements disclosed and claimed herein particularly relate to the overcoming of serious difficulties attendant on temperature changes in liquid sulfur in such processing of sulfur. More particularly, this invention relates to the refining of raw sulfur by distillation to remove to any desired extent certain impurities such as selenium.

Sulfur in the liquid state is quite fluid at somewhat above its solidus melting temperature, having a low viscosity in the temperature range of about 220° F. to about 325° F. It is also quite fluid and of low viscosity at temperatures of about 500° F. and above, to and including its vaporization temperature at atmospheric pressure. However, between about 325° F. and about 500° F., the viscosity of the sulfur rises and the sulfur tends to change to the state of viscous sulfur, generally known as "plastic" sulfur, which when formed may persist also at lower temperatures although it is unstable and, at normal temperatures, gradually reverts to the normal crystalline solid form. Accordingly, in prior processes, when liquid sulfur has been heated or cooled through the intermedial temperature range, between about 325° F. and about 500° F., difficulties have been encountered due to the liquid sulfur becoming quite viscous and sometimes so stiff or "gummy" that it would not flow appreciably. The apparatus must then be shut down for mechanical removal of the sulfur or the operation interrupted while the plastic sulfur is heated to the upper temperature range where fluid flow may be resumed. This phenomenon of high viscosity in the intermediate temperature range between the relatively cool and relatively hot liquid states presents serious difficulties in such operations as distillation of sulfur and the condensation of sulfur vapor and recovery of solid sulfur therefrom.

Although attempts were made to overcome the foregoing difficulties, none, as far as I am aware, was entirely successful when carried into practice commercially on an industrial scale.

It has now been discovered that continuous and uninterrupted operation may readily be maintained by a special heating or cooling of the liquid sulfur through the viscous temperature range in a body of liquid sulfur maintained above or below this viscous temperature range, as the case may be.

It is an object of the present invention to provide an improved method and apparatus for processing sulfur through a temperature interval at which viscous sulfur normally forms.

It is also an object of the present invention to provide an improved method and apparatus for specially heating sulfur through a temperature interval at which viscous sulfur normally forms.

Another object of the invention is to provide an improved method and apparatus for specially cooling sulfur through a temperature interval at which viscous sulfur normally forms.

The invention also contemplates providing an improved method and apparatus for purifying sulfur.

It is a further object of the invention to provide an improved method and apparatus for recovering substantially pure sulfur from crude sulfur containing selenium.

The invention further contemplates providing an improved method and apparatus for recovering substantially pure sulfur and a selenium-rich product from crude sulfur containing selenium.

Other objects and advantages will become apparent from the following description taken in conjunction with the accompanying drawing in which:

Figure 1 is a schematic flow diagram of the system showing in a simplified way the general arrangement and construction of one embodiment of the invention;

Fig. 2 is a fragmentary vertical cross section through a portion of the distillation column showing details of the sulfur feed trays, taken at plane 2—2 of Figs. 1 and 3;

Fig. 3 is a horizontal section of a feed tray as viewed on line 3—3 as indicated on Fig. 2;

Fig. 4 is a schematic elevational section through the longitudinal axis of the liquid sulfur quench and surge tank;

Fig. 5 is a fragmentary cross section taken at the vertical plane 5—5 in Fig. 4.

Figure 6:
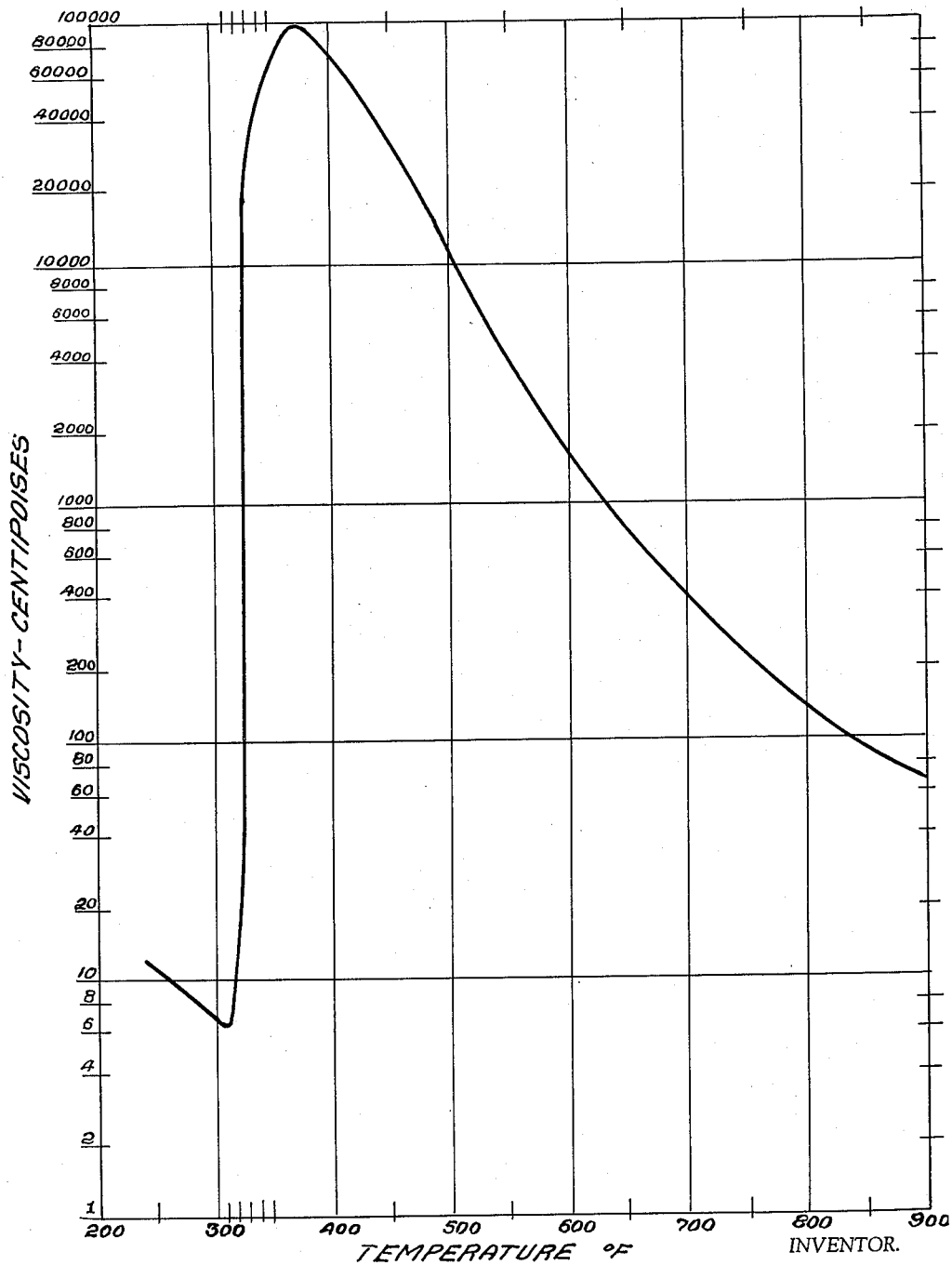
Fig. 6 depicts a curve showing the viscosity of liquid sulfur.

In its broader aspects, my invention relates to novel improvements in the method of and apparatus for handling liquid sulfur wherever liquid sulfur is required to be processed in the liquid state between the temperature ranges, high and low, of fluid liquid sulfur, i.e., between temperatures in the range of about 250° F. to 325° F. and temperatures above about 500° F. in which the liquid body is maintained fluid throughout such processing. In its more specific aspects, my invention comprises improvements in the refining of sulfur by distillation and even more specifically, in the purifying of sulfur contaminated with selenium by such distillation. Such purification of sulfur with respect to selenium by distillation has heretofore been considered with skepticism by many experts in the art, but such purification may now be done effectively in my invention. Thus, my invention could be used in the procedure of Renzoni et al. as disclosed in U.S. patent application Serial No. 407,585, filed February 1, 1954, now U.S. Patent No. 2,839,461, to recover substantially pure sulfur containing only a trace of selenium by my novel distillation process. In the Renzoni et al. application, slimes from electrolytic processes, in particular that process involving the electrolytic treatment of nickel sulfide, are obtained which consist mainly of elemental sulfur together with contaminants, in particular selenium in amounts of about 0.2%, and elemental sulfur is extracted from the slimes by distillation. My improvements are believed to be a significant factor in the operation of distilling substantially pure sulfur from crude sulfur containing selenium.

In my apparatus, I provide reservoirs adapted to receive and hold substantial quantities of fluid liquid sulfur and provided with temperature maintaining means adapted to heat or cool the fluid liquid sulfur in the reservoir so as to maintain it above or below the viscous temperature range as the case may be. These reservoirs are provided with level control means to maintain them sufficiently filled with liquid sulfur. The apparatus thus is provided with means for controlling both the amount and temperature of liquid sulfur in these reservoirs. The apparatus also includes means for introducing liquid sulfur, to be heated or cooled as the case may be, continuously into the reservoir so as to mingle rapidly with and be dispersed in the body of sulfur, thus to rapidly heat or rapidly cool, i.e., to flash-heat or flash-cool, the sulfur through the viscous temperature range. Plastic sulfur is readily soluble in the fluid sulfur maintained at either above or below the viscous temperature range and any plastic sulfur is dissolved in the reservoir substantially as formed. The sulfur thus flows continuously into and through the reservoir, abruptly increasing or decreasing in temperature in so doing, without any clogging of the device or becoming difficult if not impossible to pump which usually attends such heating or cooling step.

The method of my invention includes the detention of liquid sulfur at a terminal temperature desired for succeeding steps outside of one extremity of the viscous range of liquid sulfur and introducing the feed of liquid sulfur at an initial temperature outside of and at the other extremity of the viscous range. The sulfur thus detained is held up in sufficient quantity and for a sufficient time in relation to the rate of feed, so that the total heat of the sulfur detained is not materially altered by heating or cooling on increments of the sulfur feed being introduced, and such increments are thus rapidly heated or rapidly cooled, such as by flash-heating or flash-cooling as the case may be, to the maintained temperature above or below the viscous range of the detained liquid sulfur. The overall process may be a process of distillation or of recovering sulfur, e.g., in the solid form, from sulfur vapor, or both in combination as more particularly described by way of example hereinafter. In the distillation of sulfur the detention may be effected in the stage or stages of the distillation at which the feed is introduced.

The viscous range of liquid sulfur is illustrated by the graph in Fig. 6 in which the viscosity of liquid sulfur in centipoises is depicted for the temperature range of about 250° F. to 900° F. As can be seen by this graph, the viscosity of liquid sulfur rises very quickly from a minimum at about 310° F. and reaches a maximum of about 96,000 centipoises at about 375° F. and thereafter falls off at a slower rate. At a viscosity of 10,000 centipoises liquid sulfur flows like thick maple syrup or heavy motor oil so that by the graph it can be seen that between about 325° F. and about 500° F. sulfur is in a very viscous state. It is found that the viscosities of 10,000 centipoises and over which occur in this range of temperature are those in which the sulfur occurs in the viscous or plastic condition which must be avoided in practising this invention. Advantageously, a more fluid condition of the liquid sulfur in this invention may be obtained by operating outside the temperature range of about 310° F. to about 700° F.

The system illustrated in Fig. 1 is adapted to separate substantially pure sulfur which may contain only a trace of selenium from a sulfur feed which may comprise, for example, about 99.8% sulfur and about 0.2% selenium. The major parts of the system are a distillation column 10 of the conventional bubble-tray type, from which purified sulfur escapes as overhead at duct 11 and a bottoms waste product containing, for example, about ten to twenty per cent selenium, is removed periodically through the pipe 12. Sulfur feed is supplied to the system by the pipe 13 and one or more branches 14, 15 and 16 to certain intermediate feed trays of the column 10 as will be subsequently explained in detail. The vapor from the duct 11 is condensed in the condenser 17 and the hot liquid sulfur is removed from condenser 17 by pipe 67 and is collected in a tank 18 from which a portion of the hot liquid sulfur is returned to the top of the distillation column as reflux through pipe 19 while the balance, or net recovery of purified sulfur, is removed by pipe 20 to a sulfur quench and surge tank 21. From the surge tank, the net recovery of purified sulfur is discharged by pipes 22 and 23. The purified liquid sulfur from pipe 23 may be passed to a sulfur solidifier 24 indicated by a rectangle on the drawing. The sulfur solidifier 24 may be the type described in detail in Miller U.S. Patent No. 2,629,895, to which reference may be had for the construction and operation of a device of this type.

The system shown in Fig. 1 may be conveniently operated at atmospheric pressure and to this end, a conventional vent condenser 60 and a vented wash or quench tower 61 may be provided. Residual sulfur vapors from the condenser 17 flow through the vent condenser 60 to reduce the temperature below about 300° F. before being exhausted to the quench tower 61, where they are scrubbed with water before escaping eventually to the atmosphere. The quench and surge tank 21 is also vented through the quench tower as indicated in Fig. 1.

The impure liquid sulfur feed to the distillation column 10 is delivered at a controlled rate through pipe 13 from the preceding preparation step such as, for example, a filtering operation. Pipe 13 and associated branch pipes 14, 15 and 16 are steam jacketed as is well known in the art to keep the sulfur within the lower fluid liquid temperature range between about 250° F. to about 325° F. and advantageously between about 250° F. and 310° F., at which temperature it enters the distillation column 10 onto at least one of the selected feed trays 25, three of which are shown by way of example in Fig. 1 at spaced intervals in the intermediate section of the distillation column 10. The distillation column may have a suitable number of trays to effect the desired degree of purification and in the installation herein described to provide reduction of selenium in the overhead, for example, to only a trace, about fifty bubble trays may be provided, the three feed trays 25 being, for example, the tenth, fifteenth and twentieth tray from the bottom of the distillation column.

Each of the branch pipes to the feed trays is provided with a valve by which it may be cut into the feed supply line, these valves being indicated in Fig. 1 at 14a, 15a and 16a in the branches 14, 15 and 16, respectively. In operation usually only one of these valves is opened, the other two being closed, and selecting one of the three trays 25 is the first stage or step in the distillation. The purpose of providing a selection of feed trays is to provide flexibility for distilling different feed compositions, the relatively purer feeds being introduced at the highest tray, intermediate grades at the middle tray, and feeds containing the highest amount of selenium impurity being introduced at the lowest feed tray.

A typical section of the tower including a feed tray 25 is shown in sectional elevation by Fig. 2 to a larger scale than Fig. 1, and a sectional plan of the tower at the feed tray is shown in Fig. 3. Fig. 2 shows a typical feed tray 25, a typical bubble tray 26 above the feed tray and a typical bubble tray 27 below the feed tray. All the trays are provided with conventional bubble caps 28 mounted on vapor risers and with downcomers for overflow of liquid sulfur to the tray below, as is well known in the art, and in all the trays except the feed trays, as is illustrated by the trays 26 and 27 in Fig. 2, these bubble caps are spaced closely adjacent the tray floor on short risers 32, and the downcomers 31 extend only the normal short distance above the tray to limit the liquid depth to a shallow depth for vapor-liquid contact only. In contrast, the feed trays 25 between the normal distillation trays 26 and 27 are provided with a substantial mixing zone below the bubble caps 28, into which a tangentially directed nozzle 33 injects a jet of feed sulfur at the lower temperature and causes a swirling circulation of the hot liquid therein. The downcomer 29 and risers 30 extend through the mixing zone, the risers 30 supporting the bubble caps 28 above normal adjacent relation with respect to the floor of the tray 25 and the downcomer 29 providing overflow from the reservoir at a level providing a substantial volume flooding the mixing zone and the bubble caps providing the vapor-liquid contact zone in the reservoir at each tray 25. When supply of sulfur through a nozzle 33 is shut-off, the vapor-liquid contact zone only is operative and the mixing zone is dormant, but available whenever the feed mixture is such as to require its use. The substantial volume of hot liquid sulfur in the reservoir in the tray 25 rapidly heats, i.e., flash-heats, the jets of cooler sulfur injected and mixed therewith by the tangential nozzles 33.

The flow of hot liquid sulfur from the condenser 17 to the reflux tank 18 may be by gravity, as shown in Fig. 1, and it is obviously possible to elevate both the condenser and reflux tank so as to utilize gravity flow out of the reflux tank; however, the liquid condensed sulfur at about 700° F. is very fluid and readily pumpable by means of centrifugal or other conventional type pumps and in the example shown in Fig. 1, an immersion type centrifugal pump 36 is provided within the reflux tank 18, driven from above by motor 37, which discharges the hot sulfur under pressure through the pipe 38 and the branches 19 and 20 extending therefrom. Flow through these branches may be apportioned by the valves 39 and 40 to regulate the amount of reflux of pure sulfur to the distillation column 10. The balance of the sulfur at about 700° F. flows through pipe 20 to the tank 21. The tank 18 and pipes 19 and 20 are electrically or otherwise heated and insulated to maintain the sulfur therein at about 700° F., in conventional manner known to persons skilled in the art.

The hot sulfur outflow from the reflux tank 18, delivered through pipe 20, flows to the liquid sulfur quench and surge tank 21 which is shown diagrammatically in greater detail by Figures 4 and 5. Pipe 20 connects to nozzle 41 which enters the tank 21 at the top and discharges into a distributing feed trough 42 which extends longitudinally within the tank 21. This trough is closed at both ends and the sulfur overflows along one side which is lower than the other and is provided with serrations or teeth 42a defining notch-shaped weirs along the trough through which the liquid sulfur flows in distributed streams. A centrifugal pump 43 is provided adjacent the bottom of tank 21, driven from above by motor 44 and discharging through pipe 22 and branches 23 and 45. The branch 23 has therein a valve 46 which is subject to control of a level control instrument 47, actuated by a liquid level controller 54 in tank 21, so as to close the valve when the amount of liquid sulfur in the tank 21 reaches a minimum predetermined quantity. Hot sulfur delivered through branch pipe 45 is circulated through the heat-exchange portion 48 of a waste-heat boiler 49 and returned to the tank by pipe 50 which is connected to the nozzle 51 which, like the nozzle 41, discharges into the feed trough to mingle with the hot liquid sulfur from the reflux tank 18 and overflow therewith into the body of cooled liquid sulfur in the tank 21. A submerged steam coil 55a is provided in the bottom of tank 21 for use in starting up operations to melt any solid sulfur which may be in the tank 21 at such time.

The waste-heat boiler 49 is of conventional construction and is provided to remove heat from the sulfur to cool it sufficiently for use as feed to the solidifier 24, and recover a portion of the heat supplied to the reboiler 34 in the form of low-pressure steam. Any other suitable heat exchanger may, of course, be substituted for the waste-heat boiler but in view of the relative proximity of the boiling point of water to the optimum temperature of liquid sulfur for feed to the solidifier, namely about 250° F., a waste-heat boiler is particularly suitable for this purpose. Typically, as shown in Fig. 1, the waste-heat boiler may include a shell and tube heat exchanger 48, the water being heated in the tubes and the sulfur to be cooled being circulated through the shell. Evolved steam and any entrained water passes to the separator 52 from which separated low-pressure steam passes out at the top. Boiler feed water is supplied by a valve 53 under control of level regulator 54a, in such amount as to supply water at the rate at which evaporation occurs by the heat recovered from the circulating hot sulfur.

The portion of purified sulfur withdrawn through pipe 23 and valve 46 under control of the liquid level controller 54 in the tank 21 may be delivered through branch pipes 55 which are severally connected to the respective perforated horizontally extending conduits (not shown) extending across the plates of the sulfur solidifier 24. These perforated conduits are designated by the reference numeral 49 in the specification and drawings of Miller U.S. Patent No. 2,629,895, previously referred to. Here the sulfur is solidified on water-cooled trays to a cake which may be, for example, approximately ¾" thick, and the cake is broken up into pieces and discharged as described in the Miller patent. It is to be observed that sulfur solidifying apparatus of other types may be used if desired.

It will be observed that fluid sulfur, which may be at about 250° F., leaves the tank 21 by way of pump 43 and pipes 22, 23 and 45 substantially continuously, the product portion going to the solidifier through pipe 23 being substantially the same amount as the hot sulfur, which may be at about 700° F., entering the tank 21 through pipe 20. The portion of sulfur circulated through pipe 45 and heat exchanger 48 returns at a somewhat lower temperature. To achieve the conditions as described, the rate of recirculation of sulfur through the heat exchanger 48 is maintained many times the rate of supply from the reflux tank 18, e.g., from about 10 to about 20 times, and the small flow of hot sulfur from pipe 20 is thus rapidly cooled, e.g., flash-cooled, in a large stream of cooled liquid sulfur in the feed trough 42 and mixed therewith and detained in the tank 21. The volumetric ratio necessary for flash-cooling in this instance is provided by the rate of recirculation from and to the reservoir in tank 21 rather than by the volumetric capacity of the reservoir; the latter, however, is incidentally made use of as a surge tank for start-up and shut-down of the solidifier 24.

The cooling medium used in the condenser 17 and the heating medium used in the heating tubes 34a of the reboiler 34 is preferably a substance which is liquid and stable at the high temperatures of around 800° F. to 1000° F. involved in this service. A fused salt such as sodium nitrate, sodium nitrite mixture has been found to be quite satisfactory in installations embodying my invention. Systems for heating and cooling with such fused salt are well known in the art and are not described herein or shown in the drawings.

It is also to be understood that suitable means are provided, as in any system for handling sulfur at the temperatures involved, for preventing contact of such sulfur with oxygen or other gases reactive therewith. The convenient and conventional way of doing this is to purge the system of air with an inert gas such as nitrogen and to maintain such inert atmosphere therein. Such provision was made in the sulfur-selenium distillation system above described, the details thereof conforming to known and accepted engineering practice which need not be elaborated in the description of my invention, of which the inert gas system is not a part.

The selenium-enriched liquid bottoms from the distillation column 10 are concentrated by boiling the bottoms in a reboiler 34 which further enriches the selenium content. Pipe 12d connects the reboiler 34 with the discharge pipe 12 extending from the bottom of the distillation column 10. When the concentration of the bottoms in the reboiler 34 has been effected to the desired extent the bottoms are periodically removed through pipe 12 by opening the valve 12a. Valve 12b is provided in pipe 12d to shut off the reboiler from pipe 12 when desired and valve 12c is provided in the upper portion of pipe 12 to cut off discharge of bottoms from the distillation column 10 when desired. The accumulation of bottoms from the distillation column is very small and the bottoms may be withdrawn batchwise to bottoms cooling tanks 62 where the bottoms containing 10% to 20% selenium may be cooled below the ignition temperature and to a point where the viscosity is sufficiently reduced to permit filling of drums.

Within the column the sulfur is contacted with sulfur vapor generated by the reboiler 34, and delivered to the column 10 below the first bubble tray by means of duct 35. These vapors may enter the column, at a temperature of the order of 900° F., and sulfur vapors leave the column at the top at a temperature of the order of about 850° F. after rising through the bubble trays where they mingle in contact with the liquid sulfur thereon. In this process liquid and vapor composition varies from tray to tray, from a relatively large selenium content at the bottom to substantially pure sulfur at the top. Hot liquid sulfur is refluxed through pipe 19 to the top tray, overflowing therefrom into the lower trays. The downwardly flowing liquid sulfur is thus maintained in substantial equilibrium temperature with the sulfur vapor, well above the high viscosity temperature range, such hot sulfur filling the feed trays 25 and comprising the major content of the pools detained upon these trays by the relatively high overflow level fixed by the downcomer 29. The ratio of the relatively cool sulfur supplied to the trays 25 to the total amount of sulfur detained in the pools is relatively low, for example, in the order of one part in 5 to 20, so that the cooling effect of the feed on the liquid detained in the pool is negligible and the feed sulfur is thus rapidly heated, e.g., flash-heated, through the high-viscosity temperature range to the upper low-viscosity temperature range. At the same time, heat is being supplied to the liquid in the deep pool, which in turn heats the incoming feed, by the downflow of liquid sulfur from the tray above, by heat extraction from the vapor at the bubble caps 28 and by heat of condensation of the vapor.

It is to be observed that while a single deep feed tray may be used, the provision of a plurality of deep feed trays may be desirable for various reasons such as to permit variation in location of the feed tray when only a single feed tray is used, as mentioned hereinbefore, to permit different feed compositions to be used simultaneously, and to increase the feed capacity by using a plurality of feed trays on the same feed especially when using a sulfur feed relatively low in impurities.

Distribution of the low temperature sulfur feed to several such feed trays of the columns, with a number of regular contact trays disposed between them, provides for supplying a relatively large total feed of cool liquid sulfur to the column while at the same time the feed to any one pool may be small, and the downflowing sulfur to each feed tray is heated in several stages before detention upon such tray. Moreover, the total number of bubbles available for heating the feed is multiplied, being, in the case of three such feed trays three times the area of the trays in the present example, the amount of hot liquid sulfur available by overflow from the trays above is also multiplied three times.

It is to be observed that the invention is applicable to the treatment of anode sludge. In an embodiment of the invention for this purpose, the sludge may be melted and filtered. The sulfur filtrate from the molten sludge can contain about 0.15 or 0.2% selenium. This element, of the same chemical family as sulfur, is intimately associated with it in the sulfide ore and remains so throughout the various operations up to the production of the sludge. In the separating of the sulfur from the selenium in accordance with the present invention, the molten crude sludge can be pumped at 275° F. from holding tanks to the distillation column. To avoid difficulty with high viscosity in the range of about 320° F. to about 500° F., one or more of the aforementioned deep trays are provided to insure substantially instant heating of the feed material. As indicated hereinbefore, a reboiler may be employed and a molten salt heat transfer material, externally heated by an oil-fired furnace, may be employed to supply heat to the reboiler. Vapors rise from the reboiler at about 900 to 975° F. and the column operates at the reflux ratio of about 2.5. The sulfur vapors may be passed through a sulfur condenser which is cooled by circulating heat transfer salt. Heat removal from this condenser system is through a waste heat boiler operating at about 600° F. The product from the condenser at about 800° F. flows continuously to a surge tank where it is quenched in sulfur at about 275° F. The contents of the surge tank are cooled by circulating through a waste heat boiler. Part of the circulating stream may be continuously drawn off to a rotating shelf-type sulfur cooler where the sulfur is solidified on water cooled trays to a cake about 0.75 inch thick. This product, containing less than about five parts per million selenium, can then be broken up and discharged. Since the sulfur product has an unusually low ash, bitumens, and acid content, this sulfur is highly satisfactory for commercial and industrial purposes. The selenium can be concentrated in the reboiler to about 20% and periodically tapped into a cooling tank where the temperature is lowered to about 275° F. It can then be processed in any suitable manner for recovery of pure selenium.

It is to be observed that rapid heating, e.g., flash heating, of sulfur from temperatures below to above the temperature range of about 325° F. to about 500° F. can be performed inside or outside the distillation column. Thus, the relatively cool sulfur feed may be rapidly heated in a deep pool of sulfur maintained at above about 500° F. outside the distillation column and then the resultant hot sulfur fed into a feed tray of normal proportions.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:
1. A process of producing solid flake sulfur substantially free of contaminants from contaminated liquid sulfur by distilling, condensing and flaking the sulfur, characterized by maintaining a first body of impure liquid sulfur at substantially the boiling point of the impure liquid sulfur, maintaining a second body of liquid purified sulfur at substantially the feed temperature for the solid flaking step and below the temperature interval in which viscous sulfur normally forms, flash-heating the impure sulfur feed by direct admixture into said first body, fractionally distilling said first body to provide a substantially pure sulfur vapor overhead portion and contaminant-containing liquid bottoms portion, condensing said overhead portion to a temperature above the viscous sulfur temperature range, refluxing a part of said condensed overhead portion to the fractional distillation step and flash-cooling the remainder of said condensed overhead portion by direct admixture with said second body, and removing and flaking a product portion of the liquid sulfur from said second body.

2. The process of claim 1 further characterized by boiling the contaminant-enriched liquid bottoms portion to concentrate the contaminant content thereof and maintaining the temperature of said first body by direct heat exchange with vapors evolved by said boiling of the liquid bottoms.

3. The process as described in claim 1 in which the impure liquid sulfur is contaminated with selenium and said first body is fractionally distilled to provide a substantially pure sulfur vapor overhead portion and a selenium-enriched liquid bottoms portion.

4. Apparatus for distilling sulfur supplied at a temperature within its lower fluid liquid temperature range comprising a distillation column characterized by a plurality of trays, including at least one feed tray of substantial depth providing a reservoir adapted to detail liquid sulfur at a temperature in approximate equilibrium with sulfur vapor, said feed tray comprising a tray floor, a tangentially directed feed nozzle adjacent said tray floor adapted to direct a jet of liquid sulfur feed into said reservoir, vapor risers extendnig through said feed tray floor and upwardly beyond the feed nozzle and the jet delivered therefrom, bubble caps on said risers with vapor outlets above the outlet of said feed nozzle to define a mixing zone energized by said feed nozzle adjacent said tray floor and a vapor-liquid heat-exchange zone above said mixing zone in said reservoir, and means for maintaining constant the depth of liquid in said reservoir.

5. In a distillation of liquid sulfur supplied at a temperature below that at which plastic sulfur tends to form, the improvement which comprises maintaining a reservoir of liquid sulfur of substantial depth and at a temperature approaching the liquid vaporization temperature, bubbling sulfur vapors through said reservoir in the zone adjacent its surface, and injecting the feed of liquid sulfur into said reservoir below said zone, the said reservoir comprising the first stage of the distillation process.

6. The method of continuously processing sulfur in the liquid state through a temperature interval at which viscous sulfur normally forms, comprising introducing a small feed stream of liquid sulfur at an initial temperature outside one extremity of said temperature interval into a relatively large body of liquid sulfur at a terminal temperature outside of and at the other extremity of said temperature interval, maintaining the proportions of total sulfur in said body of liquid sulfur to feed sulfur in said body of liquid sulfur between about five to one and about twenty to one, and heating said body of liquid sulfur to maintain the temperature thereof at substantially said terminal temperature.

7. In a process of recovering solid sulfur from sulfur vapor by successively condensing the vapor to liquid and solidifying the liquid to solid, the improvement comprising condensing the sulfur vapor to the liquid state at a temperature of not lower than about 500° F., maintaining an intermediate body of liquid sulfur at a temperature of not above about 325° F., quenching said condensed sulfur by direct admixture into said intermediate body, removing a portion of said intermediate body at substantially the same rate as condensed sulfur is quenched therein, and solidifying said portion.

8. In the distillation of liquid sulfur supplied at a temperature below its viscous temperature range, the improvement which comprises maintaining a reservoir of liquid sulfur of substantial depth and at a temperature approaching the liquid vaporization temperature, bubbling sulfur vapors through said reservoir in the zone adjacent its surface, and injecting a feed of liquid sulfur into said reservoir below said zone at a rate to maintain the proportion of total liquid sulfur to feed of liquid sulfur in the reservoir between about five to one and about twenty to one, the said reservoir comprising the first stage of the distillation process.

9. A method for the processing of liquid sulfur at temperatures below and above the temperature range of about 325° F. to about 500° F. which comprises mixing liquid sulfur having a temperature above about 500° F. with liquid sulfur having a temperature below about 325° F. while maintaining the temperature of the resulting mixture outside the temperature range of about 325° F. to 500° F.

10. A method according to claim 9 in which the liquid sulfur is processed below and above the temperature range of about 310° F. to about 700° F.

11. A method according to claim 9 wherein liquid sulfur having a temperature below about 325° F. is mixed with liquid sulfur having a temperature above about 500° F. and the resulting mixture is maintained at a temperature above about 500° F.

12. A method according to claim 9 wherein liquid sulfur having a temperature above about 500° F. is rapidly cooled in liquid sulfur having a temperature below about 325° F. and the resulting mixture is maintained at a temperature below about 325° F.

13. A method of producing solid sulfur substantially free of selenium from impure sulfur contaminated with selenium by distilling, condensing and solidifying the sulfur, which comprises maintaining a first body of liquid sulfur at a temperature above about 500° F., maintaining a second body of liquid sulfur at a temperature of not above about 325° F., rapidly heating impure sulfur feed by directly admixing said sulfur feed in said first body, fractionally distilling said first body to provide a substantially pure overhead portion of sulfur vapor and a bottoms portion of selenium-enriched liquid, condensing said overhead portion to a temperature of not below about 500° F., refluxing a part of said condensed overhead portion to the fractional distillation step, rapidly cooling the remainder of said condensed overhead portion by direct admixture with said second body, and removing and solidifying a product portion of the liquid sulfur from said second body.

14. A method according to claim 13 wherein the first body of liquid sulfur is maintained at a temperature above about 700° F., the second body of liquid sulfur is maintained at a temperature not above about 310° F. and said overhead portion of sulfur vapor is condensed to a temperature of not below about 700° F.

15. A process according to claim 13 in which the selenium enriched liquid bottoms portion is boiled to concentrate the selenium content thereof and the concentrated selenium rich bottoms are withdrawn and further processed to recover the selenium content thereof.

16. Apparatus for distilling liquid sulfur comprising a distillation column provided with condenser means, a plurality of bubble cap trays and at least one feed tray having substantial depth and substantial liquid-holding capacity greater than that of the aforementioned bubble cap trays in the column, tangentially directed feed means for introducing liquid sulfur feed to said feed tray proportioned such that said feed is small in relation to the liquid-holding capacity of said feed tray, means for maintaining liquid level in said feed tray, first reservoir means connected to receive high temperature liquid sulfur from said condenser means, means for returning a portion of said high temperature liquid sulfur from said first reservoir means to said column for reflux use therein, and second reservoir means adapted to hold liquid sulfur at a temperature below the temperature range of viscous sulfur and connected to receive the balance of said high temperature liquid sulfur from said first reservoir means.

17. The method for purifying impure sulfur by distillation which comprises flash heating molten impure sulfur feed from a temperature below the high viscosity range to a temperature above the high viscosity range, distilling the heated sulfur, condensing the resulting sulfur vapor to liquid sulfur of high purity at a temperature above the high viscosity range, refluxing a portion of said liquid sulfur to the distillation operation and flash cooling the remainder of said liquid sulfur to a temperature below the high viscosity range.

References Cited in the file of this patent

UNITED STATES PATENTS

| | | |
|---|---|---|
| 1,926,116 | Sheldon | Sept. 12, 1933 |
| 2,334,524 | Wenker | Nov. 16, 1943 |
| 2,414,295 | Gardner | Jan. 14, 1947 |
| 2,467,951 | Whitley | Apr. 19, 1949 |
| 2,707,163 | Thibaut | Apr. 26, 1955 |
| 2,724,641 | Bulter et al. | Nov. 22, 1955 |
| 2,772,081 | Hibshman et al. | Nov. 27, 1956 |